Figure 1:
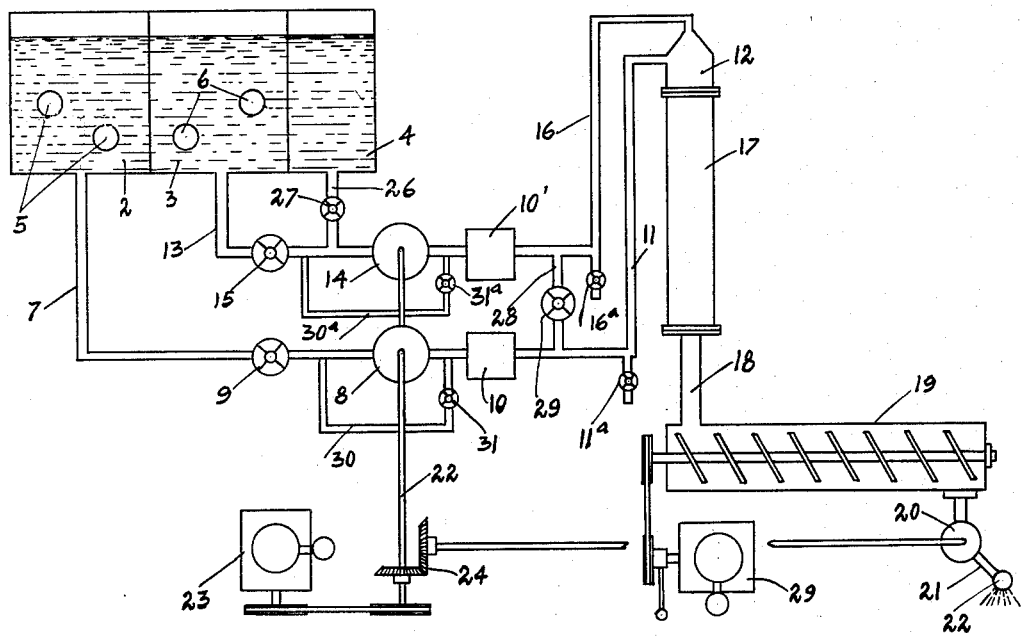

April 12, 1966

L. NAGIN ETAL 3,245,329

METHOD OF SURFACING PAVED AREAS

Filed Oct. 30, 1958

3 Sheets-Sheet 1

INVENTORS
LEON NAGIN.
HARRY S. NAGIN
DONALD H. RUSSELL.
LEO J. WOJCIK.

BY Christy, Parmelee
Strickland

ATTORNEYS.

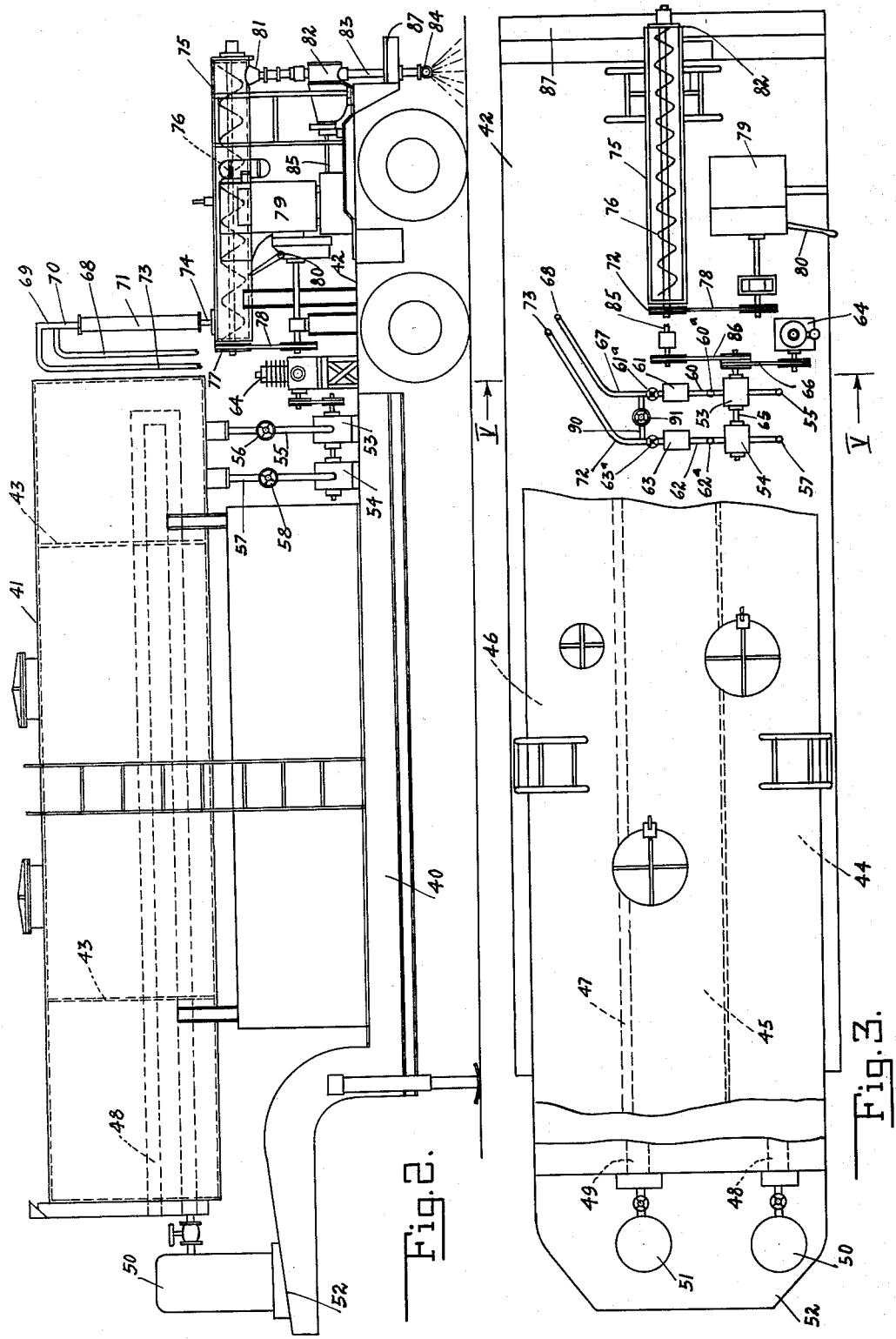

United States Patent Office 3,245,329
Patented Apr. 12, 1966

3,245,329
METHOD OF SURFACING PAVED AREAS
Leon Nagin, Churchill Borough, and Harry S. Nagin, Merion, Pa., Donald H. Russell, Pennsauken, N.J., and Leo J. Wojcik, Boston, Pa., assignors to Reliance Steel Products Company, McKeesport, Pa., a corporation of Pennsylvania
Filed Oct. 30, 1958, Ser. No. 770,772
3 Claims. (Cl. 94—22)

This invention relates to the art of paving, and is for a method of and apparatus for applying a wear and skid-resisting surface to new or used highways, runways, ramps and the like.

It has heretofore been proposed to resurface highways and the like by the use of epoxy resin and a filler which is spread over the highway, after which abrasive grains are applied in excess of the amount which the resin will contact. Following this the road surface is rolled. The resin cures in situ, bonding firmly to the concrete and to the abrasive particles which, due to being applied in the manner above described, form a continuous abrasive layer over the resin, with the resin being protected from traffic and weathering by the overlying abrasive grains.

While this provides a highly useful road surface, it has certain drawbacks. In the first place, the resin is cured by adding a catalyst, and after the catalyst is added it has a very short pot life, so that it is difficult to mix it in quantities and apply it over an extensive area, and it is expensive in large operations to stop every few minutes to make up a new batch, or to estimate in advance just how long a batch will remain in the spreader. In large mixes, there is an exothermic reaction which greatly shortens the pot life, and unless the catalyst is thoroughly mixed through the resin, the bonding of the resin is non-uniform and unpredictable.

Added to these difficulties is the fact that the resin has a thermal coefficient of expansion and contraction much different from that of concrete and is quite hard and inelastic. By mixing sand with the resin, this condition can be somewhat relieved, but it is nevertheless a condition which may cause spalling, especially on old concrete, since the resin bonds to the surface of the concrete more tenaciously than the concrete coheres to itself. Consequently, when the surfacing cools under a change of weather, its contraction is likely to pull the underlying top surface of the concrete away from the underlying concrete. This is more likely to happen on an older road being resurfaced, where the surface concrete has been weakened by weathering. The introduction of sufficient sand to be completely effective produces a material that is not easily sprayed, or which is difficult to spread evenly.

Also used concrete surfaces exposed to traffic have more or less grease and oil impregnated therein which is not readily wet or adhered to by the resin, and while it is the practice to get rid of some of this by scrubbing with dilute hydrochloric acid, it still is difficult to effectively eliminate.

It has been found that the epoxy resin will be substantially improved for the purposes of surfacing if it is diluted with a resinous or semi-resinous hydrocarbon, such as ordinary road tar which is a by-product of the petroleum industry and which, while a liquid, has high atomic weight molecules of a resinous or semi-resinous type. This material comes in several grades, designated RT 1 to RT 12, No. 1 being the most fluid, and No. 12 the most viscous, and it has been found that those is the range between grades 3 and 8 may be most desirable, for the purpose of this invention, these being in the less viscous to the medium part of the range. Contrary to expectation we may use as much as equal parts of road tar and epoxy resin without affecting the curing of the resin or its adhesive quality, and it renders the resin somewhat less likely under changes in temperature to tear away the concrete. It is compatible with oil and grease in the concrete, being a solvent for the oil and grease, and from that standpoint it also improves the resin. However the use of road tar at normal temperature makes a mix so viscous that it cannot be sprayed. Thiokol may be used in place of tar, but it is expensive. Also normally liquid resinous hydrocarbons extracted from petroleum residues in the manufacture of vapors may be used. Solids such as pitch diluted with volatile solvent cannot be used, since the entrapment of solvent destroys the resin for this purpose. The resin-tar mix can be further improved by substituting pine oil for some of the tar. This makes the material somewhat more fluid, but more important, it imparts a slight yield or resilience to the epoxy resin that effectively overcomes its tearing away the top surface of the concrete. While the use of tar, or tar and pine oil, overcomes the principal objection to the use of epoxy resin, there are many problems, as above explained, as to its practical application.

The present invention provides a method of combining and applying these ingredients in a rapid and effective manner. Also it provides a machine in which a minimum amount of material is lost or wasted when the machine is shut down at night or at the end of a run. Further, the invention provides a machine from which reactive ingredients can be readily flushed before they can solidify. Of importance also is the fact that the machine and method assures proper mixing and proportioning of ingredients so that the operator does not have to exercise particular skill or judgment.

Figure 4:
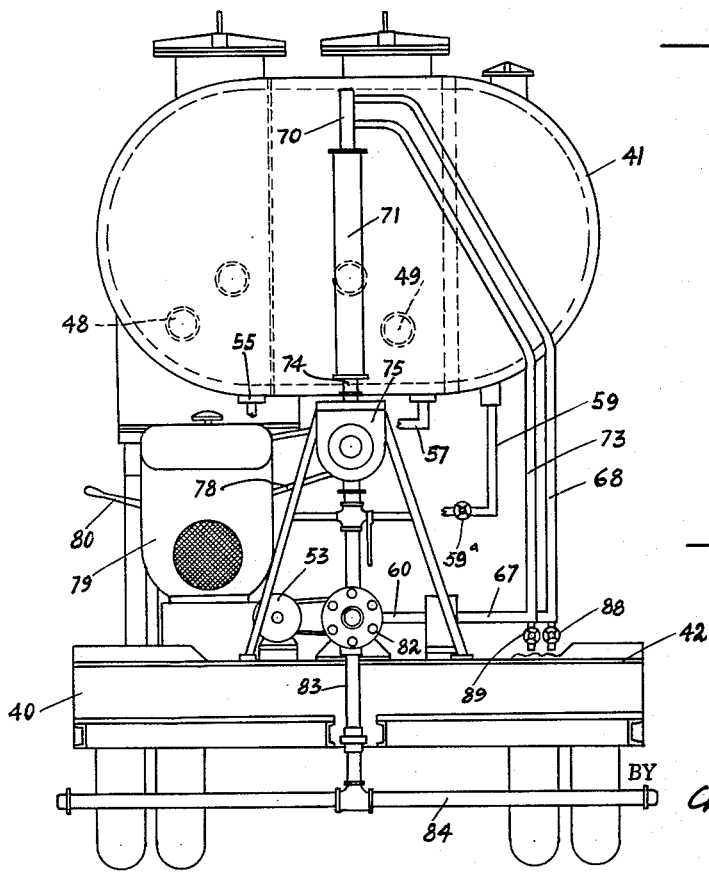
Figure 5:
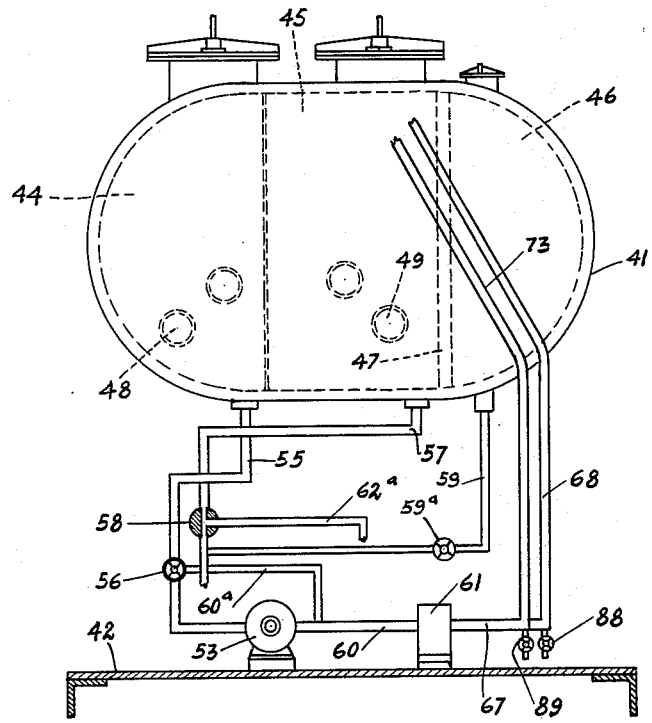
Figure 6:
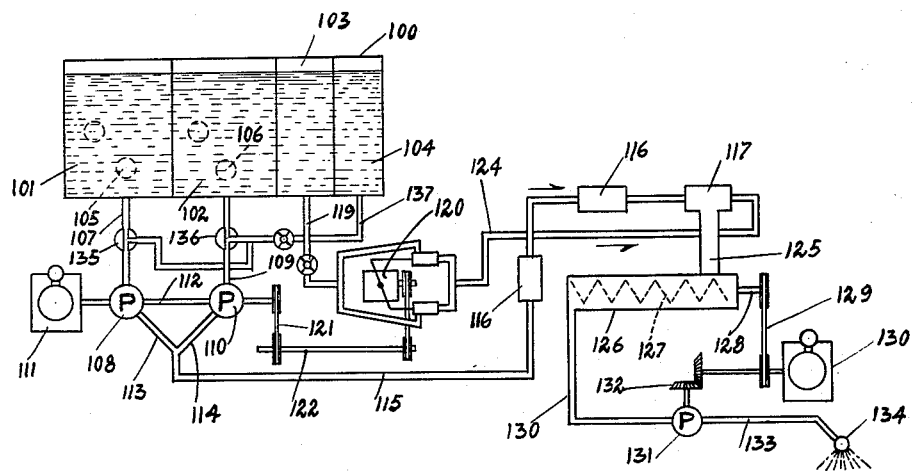

These and other objects and advantages will be more fully apparent from the following detailed description in conjunction with the accompanying drawings, in which:

FIG. 1 is a flow diagram of the apparatus and method;
FIG. 2 is a side elevation of the trailer;
FIG. 3 is a top plan view on a larger scale with the overhanging end of the tank broken away and with the mixing column removed;
FIG. 4 is a rear elevation;
FIG. 5 is a transverse section in substantially the plane of line V—V of FIG. 2, certain parts being broken away for clarity of illustration; and
FIG. 6 is a flow diagram of a modified method and apparatus.

According to the preferred practice of the present invention, the apparatus herein described is preceded by a tank truck which sprays dilute hydrochloric acid onto the used road surface, followed by a brushing machine and a rinse tank with neutralizing fluid.

The tank truck herein described is then driven along the surface to be covered and sprays the resin catalyst road tar mix over the surface. This is followed in turn by a spreader attached to the side of a truck which travels in an adjoining lane of the highway, and which feeds dry abrasive to the spreader. As one truck of abrasive is emptied, another truck takes its place. The excess abrasive which is used makes the road surface dry so that it can be immediately rolled before the resin is cured, after which the excess abrasive is brushed off and loaded into a truck for reuse.

In the preferred practice of this invention there is provided a tank truck having two main compartments and preferably a smaller third compartment. Provision is made for heating these two main compartments. The schematic arrangement is shown in FIG. 1 which is a flow diagram. The three compartments are designated 2, 3 and 4, respectively, and 5 designates heating flues in compartment 2, and 6 are similar flues in compartment 3.

Two mixes are prepared at a central mixing plant, each of which alone is stable over long periods of time. The first mix, called mix A, comprises epoxy resin of light syrupy consistency, 450 parts by weight, pin oil 50 parts by weight.

Mixture B comprises 400 parts by weight of road tar-grade 5, and 63 parts by weight of catalyst, such as diethylene triamine or other polyamine or modified polyamine commonly used to effect the bonding of the resin. When equal parts of these two mixes are combined, they will be in the approximate but not exact proportions as follows:

| | Parts |
|---|---|
| Resin | 100 |
| Road tar | 90 |
| Pine oil | 10 |
| Catalyst | 14 |

Mix A is charged into vessel 2 and mixture B into vessel 3.

The resin itself is too viscous to be sprayed, and the addition of the pine oil reduces its viscosity to some extent. Likewise the tar-catalyst mix is too viscous to be sprayed. Both mixtures can be made more fluid by heating, and since they are independently stable, they may both be heated by the circulation of hot gases through the flues 5 and 6.

Mix A is withdrawn through pipe 7 by a positive displacement pump, such as a gear pump 8. There is a valve 9 in advance of the pump to cut off the flow of liquid to the pump. It flows through a meter 10 to the base of a vertical column 11, up this column and into a connector 12. Mix B is withdrawn from the vessel 3 through pipe 13 by pump 14 similar in capacity and style to pump 8, there being a valve 15 in advance of the pump. From the pump it flows through a meter 10′ to the base of a vertical column 16, up this column into the connector 12, so that both mixes come together in connector 12.

Connector 12 discharges into the top a mixing column 17, which is a tubular pipe of larger diameter than pipes 11 and 16, and which is filled with steel shavings. This effects an initial but inadequate blending of the two mixes, and the compound leaving the mixing column flows through pipe 18 into one end of a mixing trough 19 which extends fore-and-aft of the machine. In this trough is a combined agitator and screw which churns the mix and impels it without forcing it to the discharge end. The mix flows from the bottom of this trough at the rear or discharge and through a positive displacement pump 20 into a pipe 21 that terminates in a horizontally-extending perforated cross pipe 22 that sprays the material, under the pressure of pump 20, onto the road surface.

Pumps 8 and 14 are driven at the same speed by a common drive indicated at 22 from a gas engine 23, and this engine also drives the pump 20 as schematically indicated at 24 so that the speeds of all of the pumps are properly correlated. The agitator in the mixing trough is desirably driven from a separate engine 29.

It will be seen that with this process the resin and pine oil can be mixed at a batching plant under controlled conditions and the catalyst and tar can be likewise so mixed. Since the respective mixes contain no appreciably reactive ingredients as along as they are separate, they can be prepared and used as needed, and charged into the tanks and hauled away. Also since they are non-reactive until combined, the two mixes can be heated to give them sufficient fluidity to spray from the nozzle and not merely fall from the spray pipe in streams. Because the mixes are progressively brought together, no mass reaction generating uncontrolled heating and shortening the pot life is encountered, and because the tar dilutes the catalyst, pot life is prolonged and the problem of evenly and thoroughly mixing in the field widely disproportional amounts of two ingredients is avoided. Also, by progressive or continuous mixing, instead of batch mixing, loss of large quantities of materials due to delays, work stoppage or other reasons encountered in the field, the machine and method is much more economical than previous procedures. The reactive ingredients combine at the top of the mixing column, so that if the machine stops, any reactive material will drain into the mixing trough, reducing the hazard of the resin curing in unaccessible parts of the machine. Better bonding is secured by having the material fluid enough to spray, and less resin per unit of area is required.

As previously pointed out, the high ratio of road tar to resin is not detrimental to the curing of the resin, which, however, would not be the case if pitch, thinned with volatile solvent, were employed, as in such case the surface of the resin would quickly cure, trapping solvent beneath it and produce weakness that would impair the bonding of the abrasive grains to the concrete. The pine oil, while useful in increasing the fluidity of the resin, is of increased importance because of the less brittle and slightly elastic quality that it adds to the finished road surface.

As such times as are necessary, drain cocks 11a and 16a at the bottom of the columns 11 and 16 respectively can be opened, with valves 9 and 15 closed, to drain the vertical columns, pumps and meters of residual material. Additionally with valves 9 and 15 closed, solvent from vessel 4 may be discharged through pipe 26 and valve 27, which is normally closed but which is open for the purpose and forced by pump 14 through the system to flush away any residuum materials at the end of the run. A cross pipe 28 with a normally closed valve 29 enables the solvent to flow through each of the vertical columns, if necessary, and a by-pass 30 with a valve 31 allows materials to circulate around pump 8 when the other pump is circulating solvent. There is a by-pass 30a with a valve 31a around pump 14, so that when desired, both mixtures A and B may be recirculated.

Coming now to the more detailed construction of the apparatus, 40 designates the chassis of a trailer truck, the front end of which is designed to be coupled to a motor-driven tractor in the usual way. An oval tank 41, preferably of many hundred gallons capacity, is supported on the trailer frame, and at its rear it overhangs a working deck 42. The tank has transverse bulkheads 43 between its ends that have openings therethrough to permit endwise flow of material, and has two internal longitudinal partitions forming three separate internal compartments 44, 45 and 46, compartment 46 being substantially smaller than the other two compartments. They correspond to vessels 2, 3 and 4 respectively of diagram FIG. 1. The exterior of the tank is insulated with an outer wrapper sheet around the insulation, and the partition 47 between compartments 45 and 46 may be insulated.

Each of the compartments 44 and 45 has a horizontal reentrant U-shaped tube 48 and 49 respectively, opening and discharging at the front of the tank. Two "bottles" of propane, 50 and 51, are mounted on the front deck area 52 of the trailer, and each has a burner for injecting flame into the lower leg of one of the flues to heat the contents of the compartments 44 and 45.

On the rear deck of the truck under the overhang of tank are two pumps of equal capacity, 53 and 54. A pipe 55 leads from tank compartment 44 to the intake of pump 53, and there is a three-way valve 56 for shutting off the flow of liquid to the pumps. A second pipe 57 leads from compartment 45 of the tank to the intake of the second pump 54. There is a three-way valve 58 in this line. The purpose of the three-way valves 56 and 58 is to enable the pumps 53 and 54 to recirculate the respective mixes around the pumps through by-pass lines indicated at 60a and 62a, corresponding to by-pass connections 30 and 30a in the diagram in FIG. 1. Solvent from compartment 46 may be delivered to pump 54 through pipe 59, there being a valve 59a which is normally closed, this corresponding to line 26 and valve 27 in FIG. 1.

Pump 53 has an outlet pipe 60 leading to a meter 61, and pump 54 has a similar outlet pipe 62 leading to a meter 63. A gasoline engine 64 drives a shaft 65 through a chain drive 66 so that the two pumps are driven at the same speed. From the meter 61 there is a horizontal pipe 67 that connects to the bottom of a vertical column 68 that has an inclined and rearwardly offset upper portion leading to the top of a connector 69 at the upper end of pipe 70, which pipe extends upwardly from mixing column 71. This is a tubular casing filled with baffles or metal shavings. A horizontal pipe 72 leads from meter 63 to the bottom of a vertical pipe 73 that also has an inclined and rearwardly offset upper portion that leads into connection 69 to mingle with the fluid from pipe 68.

At the bottom of the mixing column 71 there is a discharge pipe 74 that empties into the forward end of a trough 75. This tank is placed lengthwise at the center of the deck 42 and is elevated above the deck. In it is a spiral agitator 76 that stirs the contents vigorously and urges the material in the trough toward the discharge or rear end. The agitator 76 is driven by a sprocket 77 at the forward end of the trough around which there is a chain 78 driven by a separate gas engine 79, there being a clutch at 80.

At the bottom of the trough at the rear end is a discharge connection 81 that leads to a pump 82. The pump discharges into a vertical pipe 83 leading to a transversely-extending horizontal perforated spray pipe 84 that directs a spray onto the road surface across the full width of the area to be surfaced. The pump is driven by a longitudinally-extending shaft 85 driven through chain 86 from a sprocket on shaft 65, so that its speed is correlated to the speed of the two pumps 53 and 54.

A step 87 is at the rear of the truck for convenience of mounting the truck or observing the spraying. Pipes 68 and 73 are provided at their lower ends with drain cocks 88 and 89 respectively. Also there is preferably a cross connection 90 with a valve 91 therein connecting pipes 67 and 72.

FIG. 6 discloses a modification which may be used where the catalyst is in a compartment separate from the road tar and resin. In this view 100 designates the tank which in this case has four compartments 101, 102, 103 and 104. Compartment 101 may be provided with heating flues 105 as previously described, and compartment 102 may have heating flues 106 therein. Compartment 101 is designed to hold the epoxy resin; compartment 102 contains road tar or road tar mixed with pine oil in the proportions above described, while compartment 103 is for the catalyst or curing agent, and compartment 104 is for a flushing solvent for cleaning the system at the conclusion of a run. A pipe 107 leads from the receptacle 101 to a pump 108, and a pipe 109 leads from compartment 102 to a pump 110. The two pumps 108 and 110 are preferably positive displacement pumps of equal capacity and are driven together from an internal combustion engine 111 that drives a shaft 112. The outlets of the two pumps 108 and 110 are connected together by pipes 113 and 114 respectively, discharging into a common pipe 115 in which are one or more packed columns 116, these columns being filled with metal shavings or other means to baffle the flow of the liquids and effect a mixing thereof. A pipe 115 discharges into a mixer 117 at the top of a mixing column 118.

A pipe 119 leads from the compartment 103 to a positive displacement proportional feeder such as a "proportioneer" pump schematically indicated at 120. This pump is driven from shaft 112 through a chain 121, shaft 122, and a chain 123. Consequently the proportional feed chain is operated in direct proportion to the pumps 108 and 110. The curing agent discharged from the proportioning pump 120 flows through pipe 124 into the mixer 117 where its flow is counter to the flow of the incoming fluid from pipe 115, initially mixing the curing agent with the tar and resin. The resulting mixture flows down through the mixing column 125 where it is more thoroughly commingled, and thence flows into a mixing trough 126 corresponding to the mixer 75 previously described. The mixer includes an agitating screw 127 that is rotated by a shaft and sprocket 128 driven through a chain 129 from a separate engine 130. The mixture flows from the discharge end of the mixer 126 through a pipe 130 to the intake of a pump 131, which is also driven from the engine 130 through the drive designated as 132. The fluid from pipe 131 is discharged into pipe 133 and into the transversely-extending spray pipe 134.

There is a three-way valve 135 in pipe 107 and a similar valve 136 in pipe 109. Through this three-way valve arrangement the flow of fluid from the compartments 101 and 102 and their respective pumps can be cut off and solvent from the tank 104 carried through the pipe 137 to each of the three-way valves, so that solvent may be simultaneously forced through the pumps 108 and 110 to scavenge all of the resin-tar mix out of the system at the conclusion of the period of operation, as for example, at the end of a day's run.

With either the arrangement shown in FIG. 6 or in FIG. 1, the reactive ingredients are continuously brought together as the truck progressively moves over the area to be paved, and thorough mixing of the resin, road tar and catalyst is continuously effected. The ingredients are continuously and thoroughly mixed and continuously discharged into the road surface. The road surface is thereby progressively coated with a layer of the mixture and the application of the mixture occurs almost immediately after mixing, so that the material has no opportunity to set up in the machine, and its pot life is only beginning at the time that it is sprayed onto the road surface.

As explained above, a trailer is normally hitched to the back of the truck, and it continuously discharges abrasive grains over the wet coating in excess of the amount which the coating can accept. A roller or rollers may follow the spreader and immediately press the dry abrasive grains into the coating of resin and road tar so that this is done before the resin has a chance to cure, and in a progressive manner.

At the end of a run the resin and road tar may be cut off and also the flow of catalyst and solvent may be circulated through the apparatus as described. Also since at the end of the flushing operation pipes 68 and 73 will remain filled with solvent, clogging of these pipes by any material that might otherwise solidify is prevented and the solvent can be drained out by opening the cocks 88 and 89 prior to the beginning of the next run.

If sand, "Celite" or other non-reactive solid ingredients are to be incorporated, these can be dumped into the open trough 75 and mixed in with the tar-resin catalyst mix.

This application is for an improvement in application of Harry S. Nagin and Donald H. Russell, Serial No. 664,893, filed June 11, 1957, now abandoned, and is also an improvement on the disclosures contained in the earlier applications referred to in Serial No. 664,893 of Harry S. Nagin and Donald H. Russell.

While we have shown and described certain specific embodiments of our invention, it will be understood that this is by way of illustration and that various changes and modifications may be made in the construction and arrangement of parts within the contemplation of our invention and under the scope of the following claims.

We claim:

1. A method of paving which comprises providing a first mixture containing epoxy resin and pine oil, providing a second mixture containing a normally liquid road tar and a curing agent for the epoxy resin, separately heating the first and second mixtures, bringing together continuous streams of the preheated first and second mixtures in proportioned amounts and intimately mixing the two streams, continuously applying the final mixture so produced progressively over an area to be surfaced and effecting a reaction between said resin and curing agent to cure the resin in situ on said area.

2. A method of paving which comprises providing a first mixture containing epoxy resin and pine oil, providing a second mixture containing road tar and a curing agent for the epoxy resin, separately heating the first and second mixtures and continuously mixing the first and second mixtures in proportioned amounts and agitating them, continuously applying the mixture so produced progressively over an area to be surfaced and effecting a reaction between said resin and curing agent to cure the resin in situ on said area.

3. A method of paving as recited in claim 2 wherein abrasive grains are applied to the mixture over said area before the resin has appreciably cured, said abrasive grains being applied in excess of the amount which the mixture will wet, rolling the surface before the resin has cured, and removing the excess unattached abrasive grains after the resin has cured.

References Cited by the Examiner

UNITED STATES PATENTS

| | | | |
|---|---|---|---|
| 984,455 | 2/1911 | Tomer | 239—131 |
| 991,814 | 5/1911 | Akeley | 259—151 |
| 1,104,633 | 7/1914 | Cressy | 239—131 |
| 1,210,069 | 12/1916 | Hendricks | 239—131 |
| 1,320,029 | 10/1919 | Savage et al. | 239—131 |
| 1,953,294 | 4/1934 | Gabriel et al. | 94—22 |
| 1,960,865 | 5/1934 | Carson | 94—22 |
| 2,347,233 | 4/1944 | Abernathy | 117—26 |
| 2,590,007 | 3/1952 | Griswold | 239—312 |
| 2,786,794 | 3/1957 | Gams | 161—184 |
| 2,788,337 | 4/1957 | Preiswerk et al. | 117—161 |
| 2,802,648 | 8/1957 | Christensen et al. | 259—95 |
| 2,821,890 | 2/1958 | Wilson | 94—44 |
| 2,835,481 | 5/1958 | Cox | 259—1 |
| 2,889,305 | 6/1959 | Lopata | 260—33.6 |
| 2,897,733 | 8/1959 | Shuger | 94—1.5 |
| 2,906,720 | 9/1959 | Simpson | 260—28 |
| 2,925,831 | 2/1960 | Welty | 138—80 |
| 2,943,953 | 7/1960 | Daniel | 117—43 |
| 2,948,201 | 8/1960 | Nagin et al. | 94—5 |
| 2,956,034 | 10/1960 | Simpson | 260—18 |
| 2,980,601 | 4/1961 | Meigs | 208—44 |
| 3,033,088 | 5/1962 | Wittenwyler | 94—22 |

FOREIGN PATENTS 802,099   10/1958   Great Britain.

CHARLES E. O'CONNELL, *Primary Examiner.*

JACOB L. NACKENOFF, WILLIAM I. MUSHAKE, *Examiners.*

UNITED STATES PATENT OFFICE
CERTIFICATE OF CORRECTION

Patent No. 3,245,329                          April 12, 1966

Leon Nagin et al.

It is certified that error appears in the above identified patent and that said Letters Patent are hereby corrected as shown below:

Column 2, line 10, "Thiokol may be" should read -- "Thiokol" may be --.

Signed and sealed this 6th day of April 1971.

(SEAL)
Attest:

EDWARD M. FLETCHER, JR.                  WILLIAM E. SCHUYLER, JR.
Attesting Officer                          Commissioner of Patents